DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED NOVEMBER 2, 1976

952 O.G. 8

T952,007

METHOD OF PACKAGING

Eric Nield, Hertford, Daphne Ann Thomas, Harpenden, and Clive William Frederick Hicks, London, England, assignors to Imperial Chemical Industries Limited, London, England

Filed Sept. 29, 1975, Ser. No. 617,527
Claims priority, application United Kingdom, Oct. 18, 1974, 45,224/74
Int. Cl.[2] B29C *17/02, 25/00;* B32B *27/00, 31/04*
U.S. Cl. 264—230
No Drawing. 22 Pages Specification

A method of packaging an article is disclosed which includes stretching a film made from a thermoplastic composition in at least one direction, and preferably in two mutually perpendicular directions, at a temperature of 10, 20° C. or up to 25° above the Vicat softening point of the thermoplastic composition using a draw ratio of 1.2:1 to 2.1:1, and then shrink-wrapping the article to be packaged in the film using a film-reheat temperature of at least the Vicat softening point and preferably at a temperature of up to 5° C. above the Vicat softening point.

The thermoplastic composition comprises a homogeneous copolymer of acrylonitrile and at least one aromatic olefin preferably styrene or α-methyl styrene having a molar concentration of acrylonitrile units of 66 to 93% or preferably 80–93%, a molar concentration of aromatic olefin units of 7 to 34%, and a molar concentration of units of at least one other ethylenically unsaturated monomer copolymerizable with acrylonitrile of 0 to 10%. The quantities are chosen to total 100 mole percent, and optionally include a compatible graft copolymer having a diene rubber substrate containing 40 to 100% molar of units of at least one conjugated 1,3-diene monomer and 0 to 60% molar of units of at least one other ethylenically unsaturated monomer copolymerizable therewith with free-radical yielding catalysts, the concentration of graft copolymer if used being such that its rubber content is not more than 50% of the thermoplastic composition. Preferably the graft copolymer when employed has a superstrate of a homogeneous copolymer of acrylonitrile and aromatic olefin with a molar concentration of 75 to 93% acrylonitrile units.

The shrinkage of a film made from the described thermoplastic composition oriented according to the invention decreases as the draw ratio increases. This is surprising since the opposite could have been expected.